US008696799B2

(12) United States Patent
Steinman

(10) Patent No.: US 8,696,799 B2
(45) Date of Patent: Apr. 15, 2014

(54) MULTI-STAGE FILTRATION DEVICE

(75) Inventor: Robert J. Steinman, Lexington, OH (US)

(73) Assignee: Stoneridge, Inc., Warren, OH (US)

( * ) Notice: Subject to any disclaimer, the term of this patent is extended or adjusted under 35 U.S.C. 154(b) by 117 days.

(21) Appl. No.: 13/253,929

(22) Filed: Oct. 5, 2011

(65) Prior Publication Data

US 2012/0137884 A1 Jun. 7, 2012

Related U.S. Application Data

(60) Provisional application No. 61/389,831, filed on Oct. 5, 2010.

(51) Int. Cl.
*B01D 45/12* (2006.01)

(52) U.S. Cl.
USPC ................ 95/271; 55/459.1; 55/455; 55/423; 55/461; 55/343; 55/337; 55/385.3; 55/426; 55/439; 96/134

(58) Field of Classification Search
USPC ........... 95/271; 55/459.1, 455, 423, 461, 343, 55/337, 385.3, 426, 439, 459; 123/516, 123/518, 519, 520, 198 E; 96/134
See application file for complete search history.

(56) References Cited

U.S. PATENT DOCUMENTS

| | | | | |
|---|---|---|---|---|
| 5,840,104 | A * | 11/1998 | Hashimoto et al. | 96/135 |
| 7,699,042 | B2 * | 4/2010 | Steinman et al. | 123/516 |
| 2008/0041349 | A1 | 2/2008 | Delaire et al. | |
| 2009/0025693 | A1 | 1/2009 | Steinman et al. | |
| 2010/0224171 | A1 | 9/2010 | Peters et al. | |

OTHER PUBLICATIONS

International Search Report and Written Opinion dated Feb. 21, 2012 issued in related International Patent Application No. PCT/US2011/54997 (13 pages).

* cited by examiner

*Primary Examiner* — Dung H Bui
(74) *Attorney, Agent, or Firm* — Grossman, Tucker, Perreault & Pfleger, PLLC

(57) ABSTRACT

A filtration device for filtering air for use with a fuel vapor recovery system, the filtration device including a housing having a cover and a base. The cover defines an outlet and a plurality of inlets allowing air to enter the housing. The housing includes a plurality of internal walls defining a plurality of chambers. The plurality of internal walls define a plurality of inlets configured to direct air entering the device to flow along the inner circumference of a cylinder, thereby generating an air stream having a sufficient flow velocity such that centrifugal force forces contaminants to separate from the air.

16 Claims, 4 Drawing Sheets

MULTI-STAGE FILTRATION DEVICE

CROSS-REFERENCE TO RELATED APPLICATIONS

The present application claims the benefit of U.S. Provisional Patent Application Ser. No. 61/389,831, filed Oct. 5, 2010, the entire disclosure of which is incorporated herein by reference.

FIELD

The present disclosure relates generally to filtration devices, and, more particularly, to a filtration device configured to remove contaminants from air used to purge a vapor canister in fuel vapor recovery system.

BACKGROUND

The automotive industry has actively sought improved emissions reduction, including reduction in emissions due to gasoline evaporation. When vapor pressure increases in the fuel tank due to conditions, such as higher ambient temperature or displacement of vapor during filling of the tank, fuel vapor flows through openings in the fuel tank. Some motor vehicles, due to increased emission standards, typically include a fuel vapor recovery system. To prevent fuel vapor loss into the atmosphere, the fuel vapor recovery system includes a vapor or purge canister for receiving fuel vapors generated in the fuel tank. A fuel vapor absorbent, typically activated charcoal, located in the vapor canister retains the fuel vapor when the vapors are displaced from the fuel tank during refilling. During operation of the engine, the fuel vapor contained in the vapor canister is purged by drawing fresh air through the canister and into the intake manifold of the engine.

Some fuel vapor recovery systems include a filtration device to filter the fresh air introduced into the canister during the purge operation. Filters that have been used include a foam filter placed in a container. However, water tends to pass through the foam filter and into the canister which reduces the effectiveness of the absorbent or charcoal. In addition, dust and/or other contaminants may build up on the foam filter and clog the filter, which further reduces its efficiency. In addition, some current filtration devices used in fuel vapor recovery systems may experience fluctuations in differential pressure, resulting in inefficient filtration of the fresh air introduced into the canister.

Therefore, it is desirable to have a low cost, low maintenance filtration device that does not require a complex, self-cleaning apparatus to filter the fresh air supplied to the vapor recovery canister. It is also desirable to have a filtration device that is configured to maintain a substantially constant differential pressure.

BRIEF DESCRIPTION OF THE DRAWINGS

Features and advantages of the present disclosure are set forth by the description of embodiments consistent therewith, which description should be considered in conjunction with the accompanying drawings, wherein.

DETAILED DESCRIPTION

The present disclosure is generally directed at filtration devices configured to remove contaminants, typically particulate matter or moisture, from air. More specifically, the filtration device may be used to filter air used to purge a vapor canister for use with a fuel vapor recovery system, for example an evaporative emission (EVAP) control system. Furthermore, the filtration device may be configured to direct air entering the device in such a manner as to generate an air stream having a sufficient flow velocity such that centrifugal force may force contaminants from the air airstream.

In addition, the filtration device of the present disclosure relates to a filter capable of separation of contaminants, including dust and/or water, from an air stream, regardless of variation in air flow. The efficiency of the filtration device disclosed in the present disclosure is directly related to its ability to move and separate contaminants from the air stream at a high velocity.

Figure 1:
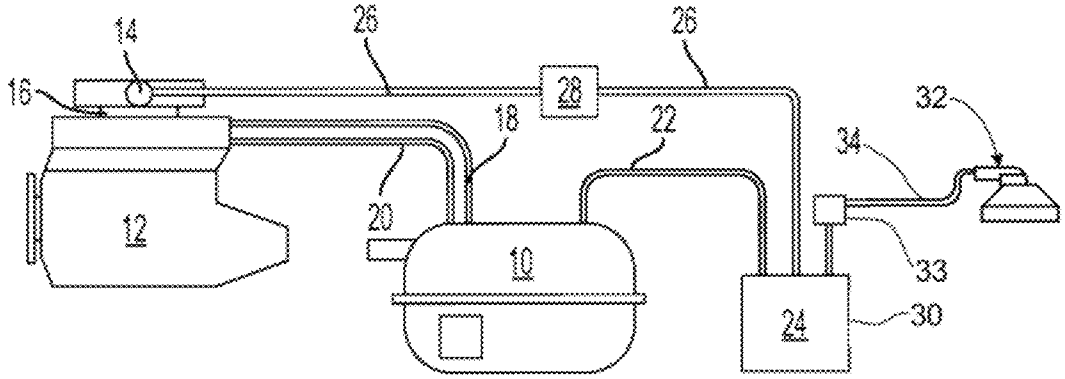
FIG. 1 is a schematic view of a vapor recovery system for use with an internal combustion engine utilizing a filtration device according to the present disclosure.

Turning now to the drawings, FIG. 1 schematically illustrates a filtration device, seen generally at 32, which may be used with a fuel vapor recovery system of the type used in an automotive vehicle, such as an EVAP system. Automotive fuel systems may include a fuel tank 10 that stores fuel for use with an engine 12. A throttle valve 14 adjacent an intake passage 16 may control the amount of intake air supplied to the engine 12. Fuel is supplied to the engine 12 from the fuel tank 10 through a fuel supply line 18 and unused fuel is returned to the fuel tank 10 through fuel return line 20. It should be appreciated by those skilled in the art that a fuel system having no fuel return line 20 may also be used.

During operation of the engine 12, at elevated temperature, and during refueling of the fuel tank 10, fuel vapors may be formed in the fuel tank 10. A vapor recovery system may include a fuel vapor vent line 22 used to vent fuel vapor from the fuel tank 10. Thus, when fuel enters the fuel tank 10 during the refueling operation, fuel vapor exiting the fuel tank 10 is directed through the fuel vapor vent line 22 to a fuel vapor storage canister 24. The vapor storage canister 24 may be filled with an absorbent material, such as activated charcoal, that absorbs the fuel vapor.

Periodically, the fuel vapors may be purged to refresh the vapor storage canister 24. During the purging process, fuel vapor stored in the vapor storage canister 24 may be drawn through a purge line 26 into the intake passage 16. When the engine 12 is operating, the intake passage 16 operates at a negative pressure, thus the fuel vapors stored in the vapor storage canister 24 may be drawn into the intake passage 16. Flow from the vapor storage canister 24 to the intake passage 16 may be controlled by a solenoid valve 28. The solenoid valve 28 may be positioned in the purge line 26 and may be connected to and receives an operating signal from an engine control unit (not shown). In this way, the engine control unit may operate to control the amount of fuel and air supplied to the engine 12 to achieve the desired air/fuel ratio for efficient combustion.

In order to purge the vapor storage canister 24, fresh air may be drawn into the vapor storage canister 24 through a fresh air inlet 30 located on the vapor storage canister 24. Typically, a filter 32 may be placed on or adjacent the fresh air inlet 30 and may be used to filter the fresh air to remove any dirt, dust and water prior to the air being introduced into the vapor storage canister 24. Depending upon the location of the vapor storage canister 24 and the filter 32 on the vehicle, a fresh air line 34 may be used to transport the clean or filtered air to the vapor storage canister 24. It is evident that while the filter 32 is shown separated from the vapor storage canister 24, the filter 32 may be placed adjacent, connected to, or formed internal with the vapor storage canister 24, thus eliminating the need for a fresh air line 34. Some systems place the vapor storage canister 24 adjacent, connected to or internal with the fuel tank 10.

In many instances, a canister vent solenoid 33 may be used to close the fresh air line 34 during a system leak check. The filter 32 may be used with the canister vent solenoid 33. However, such use is not always necessary. Additionally, the canister vent solenoid 33 can be incorporated into the filter 32, typically when the filter 32 is formed as part of the vapor storage canister 24.

Turning now to FIGS. 2-5, a filter 32 according to one embodiment of the present disclosure is shown. The filter 32 may include a housing 35 having a cover 36 coupled to a base 38. In the illustrated embodiment, the cover 36 and base 38 are coupled to one another by a snap-fit means 37. In other embodiments, the cover 36 may be coupled to the base 38 by adhesives, sonic welding, spin welding, and/or other means understood by one skilled in the art. In keeping with the present disclosure, there are other options known to individuals skilled in the art for attaching, securing and sealing the cover 36 to the base 38.

While shown herein as substantially conical, the shape and/or size of the housing 35, including the cover 36 and base 38, may vary. In other embodiments, for example, the housing 35 may be substantially cylindrical or some other geometry configured to achieve a particular air flow pattern within.

The cover 36 may define at least one first air inlet 40 and an air outlet 42. The air outlet 42 may define an outlet passage 46 that is configured receive filtered air 47. The outlet passage 46 may further be configured to transfer the filtered air 47 to the vapor storage canister 24 via the fresh air line 34 and/or canister vent solenoid 33. The air outlet 42 may be formed with a nipple connector 44 over which a hose may be clamped to provide easy attachment to the fresh air line 34 or canister vent solenoid 33. It will be apparent that when positioned separate from the vapor storage canister 24, various types of attachment mechanisms may be used to connect the filter 32 to the fresh air inlet 30 of the vapor storage canister 24, including use of a twist and lock style connector instead of the nipple connector 44 shown herein.

In one embodiment, the cover 36 may define a plurality of first inlets 40 in the form of slots defined in a portion of the cover 36, positioned at least along a circumference of the cover 36. The plurality of first inlets 40 may be configured to allow air to flow into the housing 35 during a purge cycle of the vapor storage canister 24, the pattern of air flow described in greater detail herein.

Figure 3:
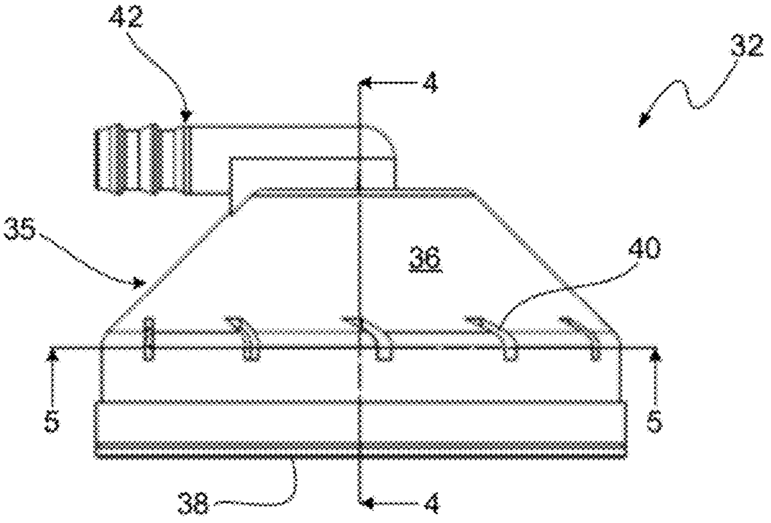
FIG. 3 is a side view of the filtration device shown in FIG. 1.
Figure 4:
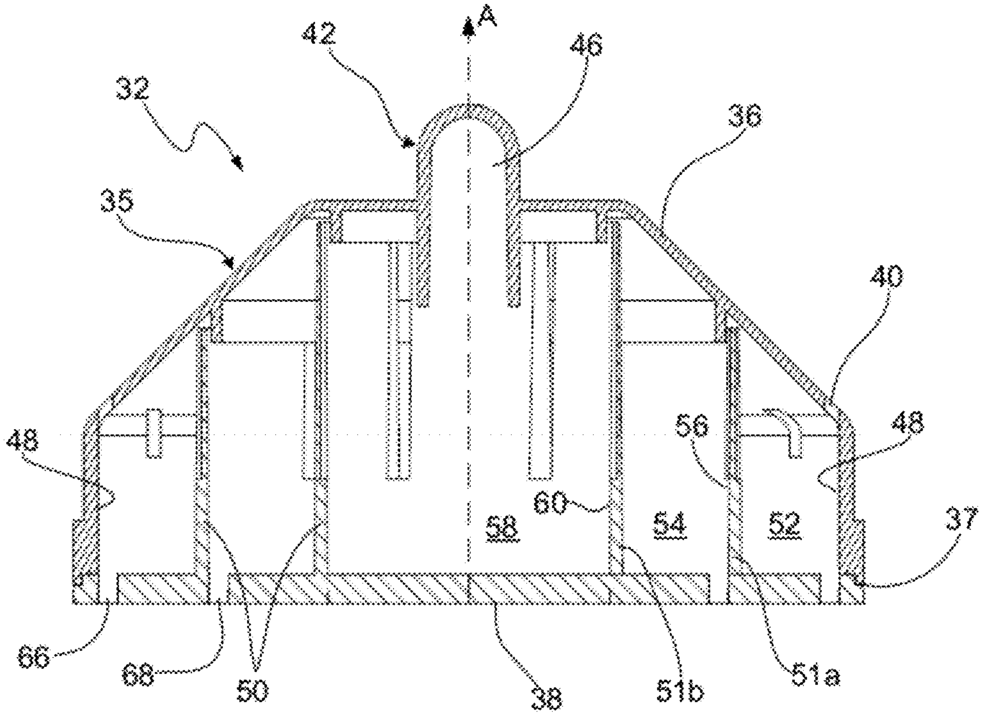
FIG. 4 is a side sectional view of the filtration device shown in FIG. 3 taken along lines 4-4.
Figure 5:
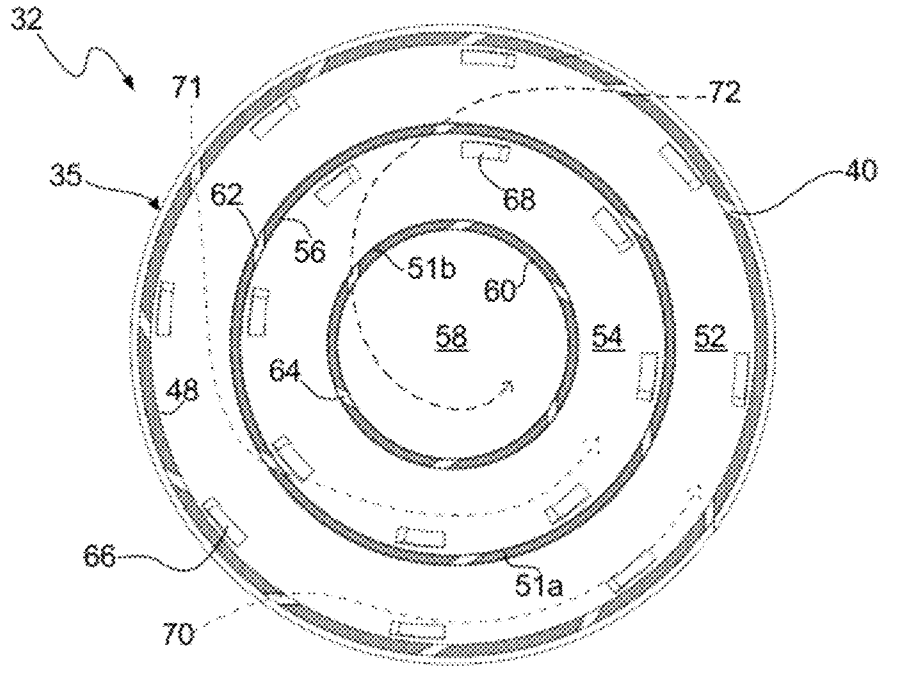
FIG. 5 is a top sectional view of the filtration device shown in FIG. 3 taken along lines 5-5.

FIG. 4 illustrates a side sectional view of the filtration device 32 taken along lines 4-4 of FIG. 3. FIG. 5 illustrates a top section view of the filtration device 32 taken along lines 5-5 of FIG. 3. As shown in FIGS. 4 and 5, the housing 35 may include a cylindrically-shaped interior surface 48. The housing 35 may further include at least one internal wall 50, wherein the at least one wall 50 may be cylindrical. As shown herein, the housing 35 may include a plurality of concentric internal walls 50. In one embodiment, the internal walls 50 may be defined by the base 38 of the housing 35. In another embodiment, the internal walls 50 may be defined by the cover 36 of the housing 35. Still, in yet another embodiment, at least a portion of the internal walls 50 may be defined by the base 38 and at least another portion of the internal walls 50 may be defined by the cover 36, such that when the cover 36 and base 38 are coupled to one another, the internal walls 50 are completely defined.

The housing 35 may further include a first chamber 52 defined as the space between a first internal wall **51*a* and the interior surface 48 of the housing 35. As shown, the first inlets 40 defined on the cover 36 of the housing 35 may be oriented tangential to the interior surface 48 of the housing 35, such that during operation, at least one of the first inlets 40 may be configured to allow fresh air to enter the first chamber 52 in a direction substantially tangential to the interior surface 48 of the housing 35 and may thus flow within the first chamber 52 in a generally circular or cyclonic motion (shown in FIG. 5**).

The housing 35 may further include a second chamber 54 defined as the space between the first internal wall **51*a* and a second internal wall 51*b*. The second chamber 54 may include a cylindrically-shaped interior surface 56. As shown in FIG. 5, the first chamber 52 may be configured to be in fluid communication with at least the second chamber 54 via a second inlet 62 (shown in FIG. 5). In one embodiment, a plurality of second inlets 62 in the form of slots may be defined in the first internal wall 51*a* and positioned at least along a circumference of the first internal wall 51*a*. The plurality of second inlets 62 may be configured to allow air to flow from the first chamber 52 to the second chamber 54 during a purge cycle of the vapor storage canister 24. Similar to the first inlets 40, the second inlets 62 may be oriented tangential to the interior surface 56 of the second chamber 54. During operation, at least one of the second inlets 62 may be configured to allow air to enter the second chamber 54 in a direction substantially tangential to the interior surface 56 of the second chamber 54 and may thus flow within the second chamber 54 in a generally circular or cyclonic motion (shown in FIG. 5**).

The housing 35 may further include a third chamber 58 defined as the space within the second internal wall **51*b*. Similar to the second chamber 54, the third chamber 58 may include a cylindrically-shaped interior surface 60. As shown in FIG. 5, the second chamber 54 may be configured to be in fluid communication with the third chamber 58 via a third inlet 64. As shown, a plurality of third inlets 64 in the form of slots may be defined in the second internal wall 51*b* and positioned at least along a circumference of the second internal wall 51*b*. The plurality of third inlets 64 may be configured to allow air to flow from the second chamber 54 to the third chamber 58 during a purge cycle of the vapor storage canister 24. At least one of the third inlets 64 may be oriented tangential to the interior surface 60 of the third chamber 58. During operation, at least one of the third inlets 64 may be configured to allow air to enter the third chamber 58 in a direction substantially tangential to the interior surface 60 of the third chamber 58 and may thus flow within the third chamber 58** in a generally circular or cyclonic motion.

While shown herein as cylindrical, the chambers 52, 54, 58 and corresponding interior surfaces 48, 56 and 60, respectively, could be conical or some other combination of shapes designed to achieve a particular air flow pattern within the chambers 52, 54, 58. The chambers 52, 54, 58 may share an axis A about which air entering each of the chambers 52, 54, 58 may rotate (hereinafter referred to as "rotational axis A").

In the illustrated embodiment, the rotational axis A may coincide with the vertical or longitudinal axis of chamber 58. Such an orientation is not always required. Depending upon the desired flow pattern, the rotational axis A may be oriented in any number of positions.

In the illustrated embodiment, the base 38 may include a plurality of primary drains 66 defined on a portion thereof. At least one of the primary drains 66 may be in the form of a slot cut into the base 38. The plurality of primary drains 66 may be positioned at least along the circumference of the first chamber 52 and along the outer periphery of the first chamber 52 when the base 38 is coupled to the cover 36. Additionally, the primary drains 66 may be positioned substantially orthogonally to the internal surface 48 of the cover 36. The base 38 may include a plurality of secondary drains 68 defined on a portion thereof. Similar to the primary drains 66, at least one of the secondary drains 68 may be in the form of a slot cut into the base 38. The plurality of secondary drains 68 may be positioned at least along the circumference of the second chamber 54 and along the outer periphery of the second chamber 54 when the base 38 is coupled to the cover 36. Additionally, the secondary drains 66 may be positioned substantially orthogonally to the internal surface 56 of the first internal wall 51*a*.

Referring to FIG. 5, as fresh air 70 enters the housing 36 through the first inlet 40, it rotates within the first chamber 52 in a circular or cyclonic motion. The first chamber 52 may be configured to direct fresh air 70 entering the first chamber 52 through at least one first inlet 40 in a particular flow pattern, thereby forcing particulate matter, moisture or other contaminants in the fresh air 70 against side walls or the interior surface 48 of the cover 36. The centrifugal force created by the air 70 rotating within the first chamber 52 forces the contaminants carried in the air stream 70 against the interior surface 48. The contaminants and/or moisture, either by gravity or a secondary flow pattern producing a downward flow, are forced outward, through at least one of the plurality of primary drains 66 defined on the base 38.

Pursuant to the present disclosure, an air stream 71, after passing through the first chamber 52, may be urged inward toward the center of the third chamber 58 as additional air continues to flow into the housing 35. Upon flowing through at least the first chamber 52, the air stream 71 may be drawn into the second chamber 54. The air 71 may enter the second chamber 54 through at least one of the second inlets 62 defined in the first internal wall 51*a*, wherein the air 71 may have a particular flow pattern configured to force any particulate matter, moisture or other contaminants against side walls or interior surface 56 of the first internal wall 51*a*. The centrifugal force created by the air 71 rotating within the second chamber 54 may force any additional contaminants and/or moisture carried in the air stream 71 against the interior surface 56. The contaminants and/or moisture, either by gravity or a secondary flow pattern producing a downward flow, may be forced outward from second chamber 54 through at least one of the secondary drains 68 defined on the base 38.

Pursuant to the present disclosure, an air stream 72, after passing through the first and second chambers 52, 54, may be further urged inward toward the center of the third chamber 58 as additional air continues to flow into the housing 35. Upon flowing through at least the second chamber 54, the air stream 72 may be drawn into the third chamber 58 through at least one of the third inlets 64 defined in the second internal wall 51*b*, wherein the air may have a particular flow pattern configured to force any particulate matter, moisture or other contaminants against side walls or interior surface 60 of the second internal wall 51*b*. The centrifugal force created by the air 72 rotating within the third chamber 58 forces any additional contaminants and/or moisture carried in the air stream 72 against the interior surface 60. The contaminants and/or moisture, either by gravity or a secondary flow pattern producing a downward flow, are forced downward and against the side walls and interior surface 60.

Figure 2:
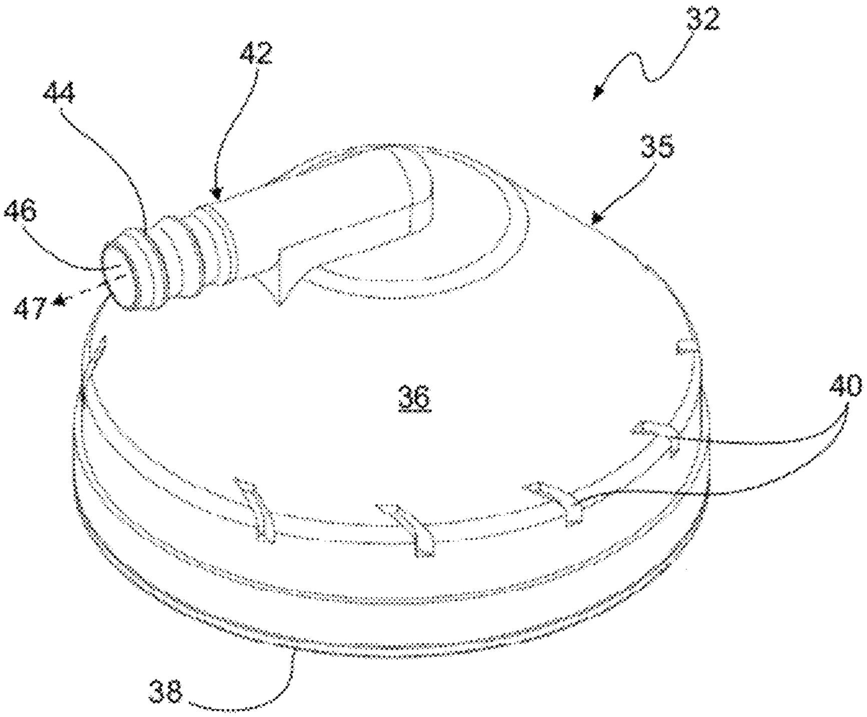
FIG. 2 is a perspective view of the filtration device shown in FIG. 1.
Figure 6:
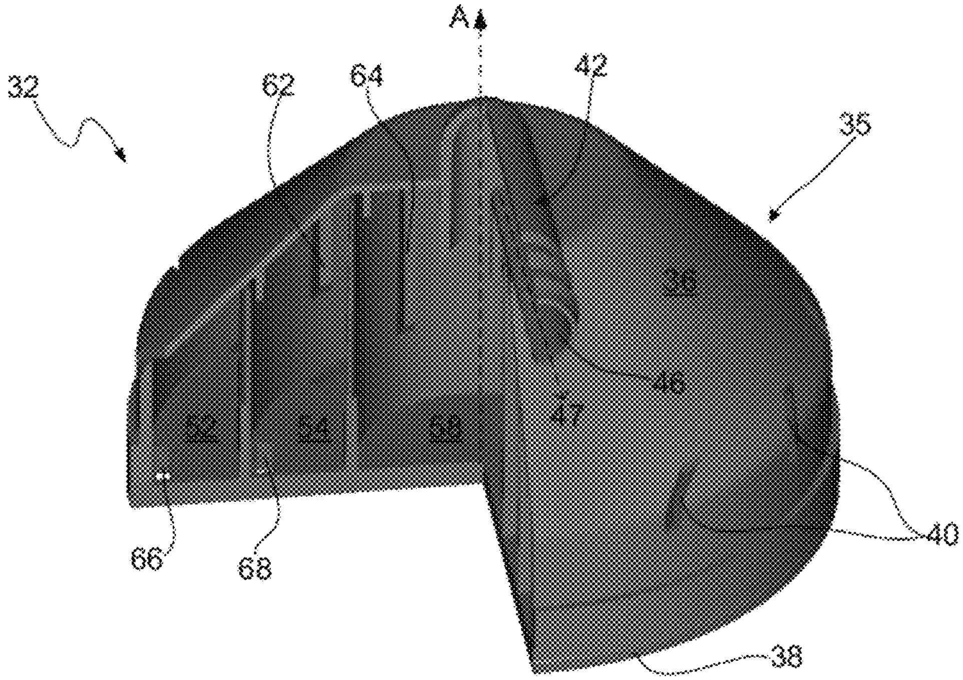
FIG. 6 is a sectional perspective view of the filtration device shown in FIG. 1.
Figure 7:
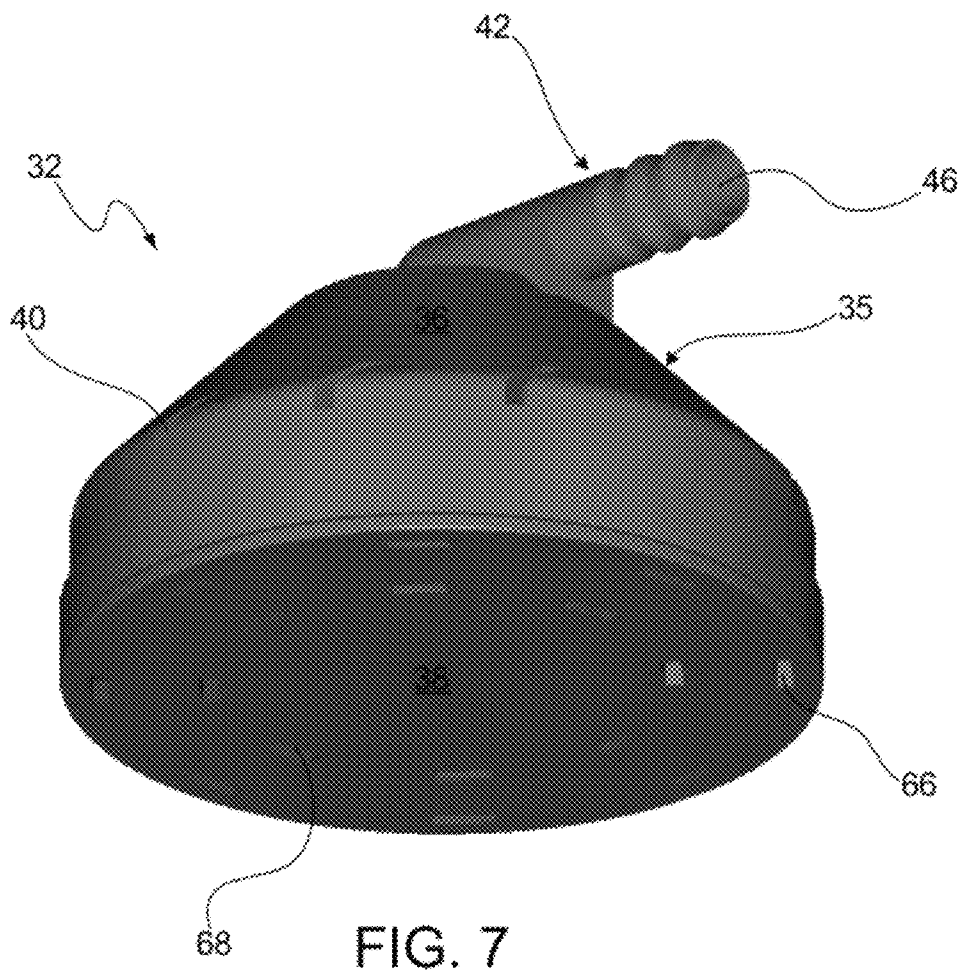
FIG. 7 is a sectional perspective view of the filtration device shown in FIG. 1.

Clean or filtered air 47 may then be drawn out of the third chamber 58 through the outlet passage 46 located at or near the rotational axis A of the chambers 52, 54, 58, i.e., along the vertical or longitudinal axis. The outlet passage 46 is not required to be positioned coincident or at the rotation axis A. It may be spaced from the rotational axis A, depending upon the flow pattern of the air in the third chamber 58. The outlet passage 46 in FIGS. 2, 4 and 6 is shown extending upwardly and out the top of the cover 36. It is evident that the outlet passage 46, and ultimately air outlet 42, should be placed along the rotational axis A as the contaminants are forced outwardly away from the center of the chambers 52, 54, 58. Additionally, placing the outlet passage 46 as set forth above may cause the least interference with the circular or cyclonic motion of the air stream 72 formed in the third chamber 58. Thus, clean, filtered air 47 may be used during the purge process to purge the fuel vapors from the vapor storage canister 24.

According to one aspect of the disclosure there is provided a filtration device for filtering air used with a fuel vapor recovery system. The filtration device includes a housing including a cover coupled to a base. The housing further includes at least one chamber defined within the housing, wherein the at least one chamber defines a passage. The filtration device further includes at least one air inlet defined on a portion of the cover. The air inlet is configured to allow air to flow into the at least one chamber such that the air is directed by the passage to rotate in the chamber about a rotational axis of the chamber. The device further includes at least one drain defined on a portion of the base, wherein a centrifugal force of the rotating air filters out contaminants contained therein and the contaminants are urged towards the at least one drain. The device further includes an air outlet defined on a portion of the cover and in fluid communication with the at least one chamber. The air outlet is configured to remove filtered air from the at least one chamber.

According to another aspect of the disclosure there is provided a fuel vapor management system. The fuel vapor management system includes a fuel vapor storage canister and a filtration device fluidly coupled to the fuel vapor storage canister. The filtration device includes a housing including a cover coupled to a base. The housing further includes at least one chamber defined within the housing, wherein the at least one chamber defines a passage. The filtration device further includes at least one air inlet defined on a portion of the cover. The air inlet is configured to allow air to flow into the at least one chamber such that the air is directed by the passage to rotate in the chamber about a rotational axis of the chamber. The filtration device further includes at least one drain defined on a portion of the base, wherein a centrifugal force of the rotating air filters out contaminants contained therein and the contaminants are urged towards the at least one drain. The filtration device further includes an air outlet defined on a portion of the cover and in fluid communication with the at least one chamber. The air outlet is configured to remove filtered air from the at least one chamber.

The fuel vapor management system further includes a valve cavity disposed proximate to the air outlet of the cover of the filtration device. The system further includes a canister vent valve disposed within the valve cavity, wherein the canister vent valve is configured to regulate the flow rate of the air through the air outlet of the cover.

According to yet another aspect of the disclosure there is provided a method of filtering. The method of filtering includes drawing incoming air containing contaminants through at least one air inlet of a filtration device from the atmosphere and directing the incoming air into a passage of a chamber defined within the filtration device. The method further includes directing the incoming air to rotate in the chamber about a rotational axis of the chamber. The method further includes generating a centrifugal force in the rotating air, wherein at least a portion of the contaminants in the incoming air are separated from the incoming air by way of the centrifugal force. The method further includes passing the incoming air from the chamber to an air outlet of the filtration device.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A filtration device for filtering air used with a fuel vapor recovery system, said filtration device comprising:
- a housing comprising a cover coupled to a base
- at least one chamber defined within said housing, said at least one chamber defining a passage;
- at least one air inlet defined on a portion of said cover, said air inlet being configured to allow air to flow into said at least one chamber such that said air is directed by said passage to rotate in said chamber about a rotational axis of said chamber;
- at least one drain defining an opening extending through a portion of said base, wherein a centrifugal force of said rotating air filters out contaminants contained therein and said contaminants are urged towards and exit said housing through said at least one drain; and
- an air outlet defined on a portion of said cover and in fluid communication with said at least one chamber, said air outlet for removing filtered air from said at least one chamber.

2. The filtration device of claim 1 wherein said at least one air inlet is defined along a circumference of said cover.

3. The new filtration device of claim 1 wherein said at least one drained is disposed substantially orthogonally to an internal surface of said cover.

4. The filtration device of claim 1 wherein said at least one drain is disposed along an outer periphery of said at least one chamber.

5. The filtration device of claim 1 further comprising at least one internal wall forming at least one additional chamber within said housing defining a passage.

6. The filtration device of claim 5 wherein said additional chamber is in fluid communication with an adjacent chamber via inlets formed on said internal wall.

7. The filtration device of claim 6 wherein at least one said inlets formed on said internal walls are configured to allow air to flow from said at least one air inlet defined on said cover into each of said chambers such that said air is directed by said passages to rotate in each of said chambers about a rotational axis of each of said chambers.

8. The new filtration device of claim 6 wherein said at least one drain further includes at least one drain disposed in said each of said chambers.

9. A fuel vapor management system comprising:
- a fuel vapor storage canister;
- a filtration device fluidly coupled to said fuel vapor storage canister, said filtration device comprising:
  - a housing comprising a cover coupled to a base
  - at least one chamber defined within said housing, said at least one chamber defining a passage;
  - at least one air inlet defined on a portion of said cover, said air inlet being configured to allow air to flow into said at least one chamber such that said air is directed by said passage to rotate in said chamber about a rotational axis of said chamber;
  - at least one drain defining an opening extending through a portion of said base, wherein a centrifugal force of said rotating air filters out contaminants contained therein and said contaminants are urged towards and exit said housing through said at least one drain; and
  - an air outlet defined on a portion of said cover and in fluid communication with said at least one chamber for removing filtered air from said at least one chamber;
- a valve cavity disposed proximate said air outlet of said cover; and
- a canister vent valve disposed within said valve cavity and configured to regulate the flow rate of said air through said air outlet of said cover.

10. The system of claim 9 wherein said at least one air inlet is defined along a circumference of said cover.

11. The system of claim 9 wherein said at least one drain is disposed substantially orthogonally to an internal surface of said cover.

12. The new system of claim 9 wherein said at least one drain disposed along an outer periphery of said at least one chamber.

13. The system of claim 9 further comprising at least one internal wall forming at least one additional chamber within said housing defining a passage.

14. The system of claim 13 wherein said additional chamber is in fluid communication with an adjacent chamber via inlets formed on said internal wall.

15. The system of claim 14 wherein at least one said inlets formed on said internal walls are configured to allow air to flow from said at least one air inlet defined on said cover into each of said chambers such that said air is directed by said passages to rotate in each of said chambers about a rotational axis of each of said chambers.

16. The system of claim 13 wherein said at least one drain further includes at least one drain disposed in said each of said chambers.

* * * * *